Patented Feb. 17, 1953

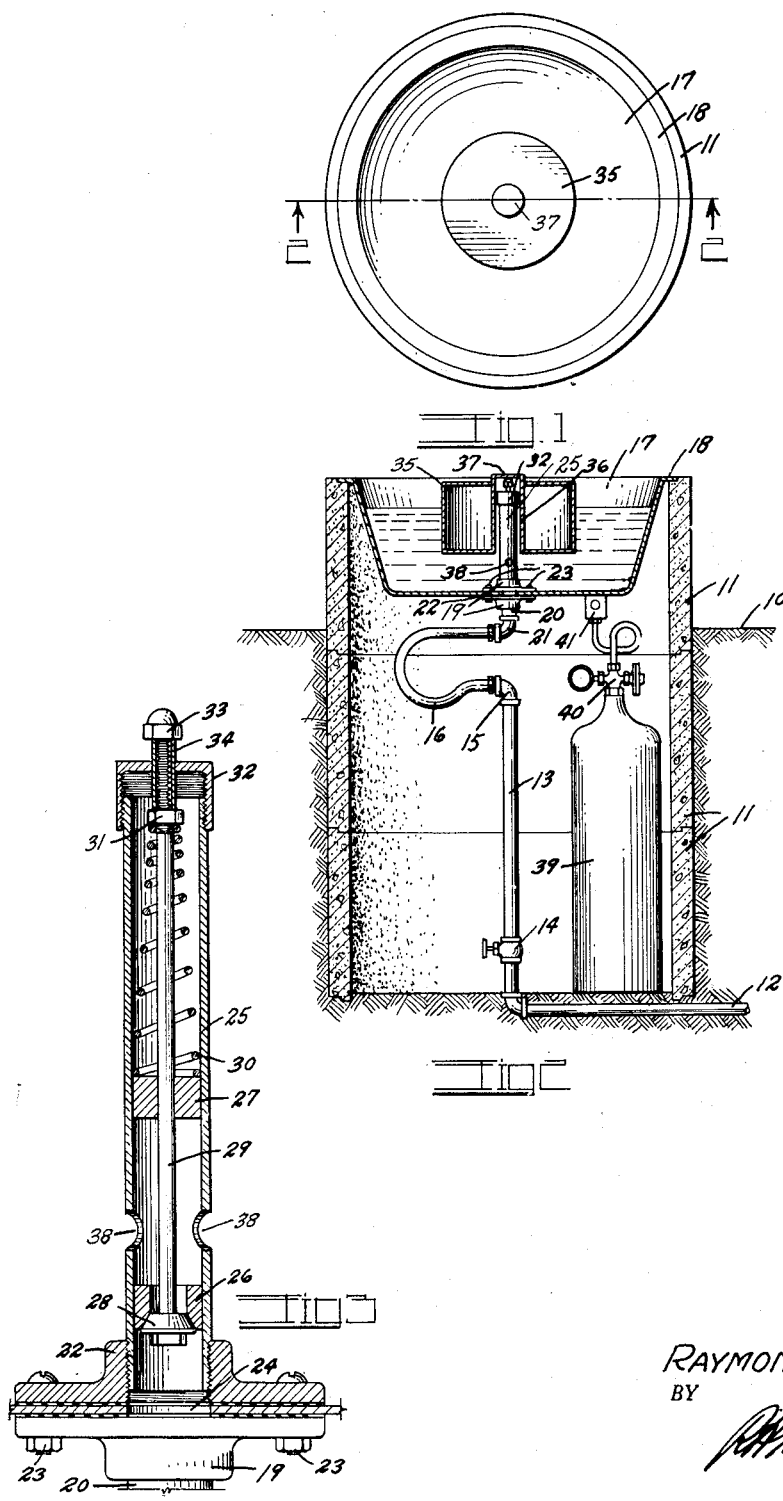
INVENTOR.
RAYMOND J. BOYD

2,628,631

UNITED STATES PATENT OFFICE 2,628,631

LIVESTOCK WATERING DEVICE

Raymond J. Boyd, Arvada, Colo.

Application November 28, 1949, Serial No. 129,765

2 Claims. (Cl. 137—430)

This invention relates to a livestock watering fountain, and has for its principal object the provision of a watering device which will automatically maintain itself filled at all times, and which will prevent the water from freezing during the winter months.

Another object of the invention is to provide an automatically filled watering trough which cannot be damaged or injured by the nuzzling of the animals.

A further object is to so construct the trough that it can be lifted from place for repair and inspection without the use of tools and without it being necessary to disconnect piping and the like.

Other objects and advanatages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved watering device;

Fig. 2 is a vertical section therethrough, taken on the line 2—2, Fig. 1; and

Fig. 3 is an enlarged detail section through the valve employed in the improved watering device.

The improved livestock watering fountain is designed to be installed below the level of the ground, indicated at 10 in Fig. 2, by digging a circular well or hole to a point below the average winter frost line thereof. The well is lined with circular concrete rings 11 which are fitted onto each other to a sufficient height to extend above the ground to a convenient level for the livestock to be watered.

A water main 12 is installed below the frost line and beneath the bottom of the circular rings 11, terminating in a standpipe 13 in the middle of the rings 11. The standpipe is controlled by a main valve 14 and terminates at its top in an elbow fitting 15, from which a length of flexible hose 16 extends.

The water is carried in a watering pan 17 having an outwardly turned peripheral edge 18 which rests upon the uppermost concrete ring 11 to support the pan 17 to form a top or cover for the closed chamber formed by the concrete rings 11.

A flanged fitting 19 is mounted on the bottom of the pan at the axis thereof and supports a pipe nipple 20 and a second elbow fitting 21. The second elbow fitting 21 is connected to the upper extremity of the flexible hose 16. A second flanged fitting 22 is secured against the bottom of the pan 17 by means of suitable clamping bolts 23 extending to the first flanged fitting 19 and outlining an opening 24 in the bottom of the pan 17.

The second flanged fitting supports a tubular valve housing 25 over the opening 24. An annular conical valve seat member 26 is soldered or otherwise formed within the housing 25 adjacent the bottom thereof, and a valve stem guide member 27 is similarly mounted therein adjacent the upper extremity thereof. A conical valve 28 is adapted to seat in the bottom of the seat member 26.

A valve stem 29 extends upwardly from the valve 28 through the guide member 27 and projects above the valve housing 25. A helical spring 30 acts upwardly against a spring nut 31 on the valve stem 29 and downwardly against the guide member 27 to constantly urge the valve 28 upwardly against its seat. The stem 29 extends through a threaded pipe cap 32 which closes the top of the housing 25 and terminated in a terminal nut 33. A bushing 34 surrounds the threads on the upper extremity of the valve stem and provides a smooth guide through the cap 32. The sides of the valve housing 25 are provided with water discharge openings 38.

A hollow, annular float 35 is positioned within the pan 17 about the valve housing 25. The weight of the float 35 is just sufficient to overcome the compression of the spring 30 and the pressure of the water against the valve 28. The float is sealed with a central guide tube 36 having an open bottom and a closed top 37. The diameter of the guide tube 36 is such as will enable it to rise and fall freely over the cap 32.

It can be readily seen that as the level of the water in the pan 17 is lowered by the drinking animal, the float will descend, allowing the closed top 37 of the central guide tube 36 to rest upon the terminal nut 33 of the valve stem 29 so as to force the valve from its seat so as to cause water to discharge through the water openings 38 to refill the pan 17 to the pre-set level.

It will be noted that the float is rigidly held in place by the substantial central valve housing 25 so that it cannot be moved from side to side, nor displaced from the valve housing by the animals.

Should access be required to the chamber within the concrete rings 11, it is only necessary to lift the entire pan 17 from place, the flexible hose 16 being sufficiently long to allow the pan to be set to one side of the uppermost ring 11 so that it is not necessary to disconnect the piping.

In many installations the ground heat encountered below the frost line in the relatively deep well of the rings 11 is sufficient to maintain the temperature within the chamber above freezing so as to prevent the water in the pan from freezing.

Heating means, however, may be provided within the well chamber. One such means is illustrated employing a tank 39 of compressed gas which discharges through a conventional valve and pressure reducer 40 to a gas burner 41 positioned below the pan 17. The heat from the burner 41 effectively prevents the freezing of water in the pan.

Electricity may also be used for heating purposes in locations where it is more economical and convenient than gas. Another method of supplying the heat is by the use of compost or decaying manure placed in the well below the pan.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. In a livestock watering device having a watering pan and a water supply conduit, valve means for maintaining a substantially uniform level of water in said pan, comprising: a flanged fitting secured to the bottom of said pan about a water supply opening in said bottom; a tubular valve housing mounted in said fitting and projecting upwardly therefrom over said opening; an annular valve seat member sealed to the walls of said fitting within and above the bottom of said housing; a circular valve stem guide member secured in said housing above said seat member, there being water discharge openings in said housing between said seat member and said guide member; a cap closing the top of said housing; a valve stem extending axially through said housing, said valve seat member, said guide member, and through said cap; a valve mounted on said stem below said valve seat member and positioned to close the latter when said stem moves upwardly; a terminal nut on the upper extremity of said stem above said cap to limit the downward movement of said stem; a spring abutment on said stem below said cap; a compressed spring surrounding said stem between said guide member and said abutment and acting to resiliently support said valve against said seat member; a float; a central guide tube in said float surrounding said housing; and a closed top member in said guide tube resting upon the upper extremity of said valve stem, the weight of said float being sufficient to compress said spring and move said valve downwardly from said seat member.

2. A valve for maintaining a substantially uniform level of water in a pan as described in claim 1, in which the circular valve stem guide member seals the upper portion of the valve housing to form a spring chamber surrounding said spring and in which the spring abutment is threaded on said stem for adjustment therealong to vary the compression in said spring.

RAYMOND J. BOYD.

REFERENCES CITED

The following references are of record in the file of this patent:

UNITED STATES PATENTS

| Number | Name | Date |
| --- | --- | --- |
| 1,007,715 | Mason | Nov. 7, 1911 |
| 1,135,917 | Partington | Apr. 13, 1915 |
| 1,147,800 | Ihrig | July 27, 1915 |
| 1,161,745 | Springman | Nov. 23, 1915 |
| 1,477,916 | Skies | Dec. 18, 1923 |
| 1,779,746 | Murdey | Oct. 28, 1930 |
| 1,982,062 | Matthews | Nov. 27, 1934 |
| 2,087,913 | Kenney et al. | July 27, 1937 |
| 2,197,686 | Flutsch et al. | Apr. 16, 1940 |
| 2,387,664 | Kubista | Oct. 23, 1945 |
| 2,455,211 | Armstrong | Nov. 30, 1948 |
| 2,479,355 | Hemker | Aug. 16, 1949 |

OTHER REFERENCES

"Popular Science," May 1949, page 120.